Jan. 15, 1957 D. E. CROOKER ET AL 2,777,498
SKID RESISTING TIRE TREADS
Filed Jan. 21, 1954 2 Sheets-Sheet 1

INVENTORS
David E. Crooker
BY Evan G. Frary
Morsell & Morsell
ATTORNEYS

Jan. 15, 1957 D. E. CROOKER ET AL 2,777,498
SKID RESISTING TIRE TREADS
Filed Jan. 21, 1954 2 Sheets-Sheet 2
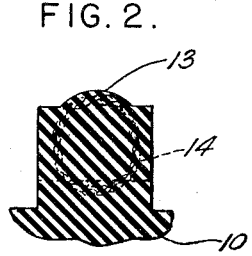
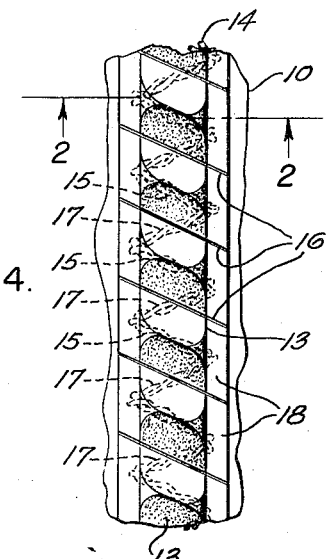
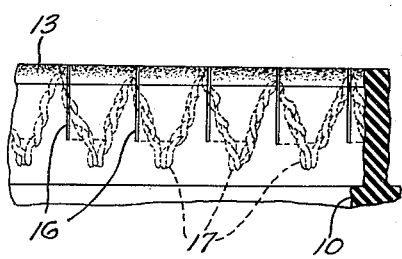
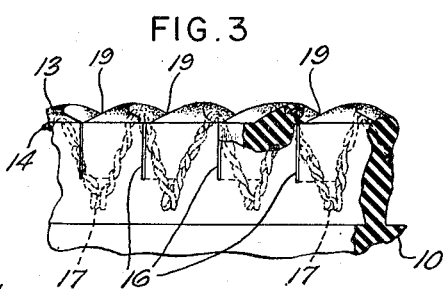
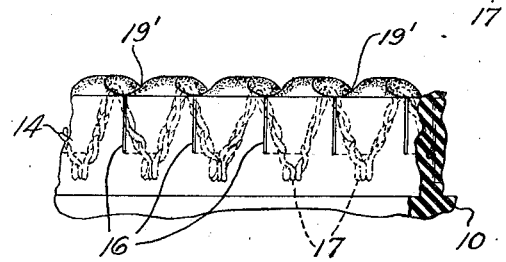
INVENTORS
David E. Crooker
Evan O. Frary
BY
Morsell & Morsell
ATTORNEYS

United States Patent Office 2,777,498
Patented Jan. 15, 1957

2,777,498

SKID RESISTING TIRE TREADS

David E. Crooker, Ontonagon, Mich., and Evan A. Frary, Marshfield, Wis.; said Frary assignor to Lloyd L. Felker, Marshfield, Wis.

Application January 21, 1954, Serial No. 405,393

4 Claims. (Cl. 152—211)

This invention relates to improvements in skid resisting tire treads.

The use of transverse slits or sipes in the rider strips of tires is well known and improves the traction properties. The use of metal coils in rider strips has heretofore been proposed in Crooker Patents Nos. 2,557,945 and 2,479,474.

It is a general object of the present invention to provide a tire tread wherein the rider strips are separated into a series of rubber road engaging blocks by transversely extending slits, and wherein metal coils are so arranged in the rider strips that said coils serve to connect the lower portions of said slit separated rubber blocks to limit the amount of separation of said rubber blocks during use and thereby prevent excessive wear on the transverse edges of the blocks.

A further object of the invention is to provide a tire tread as above described wherein the transverse slits or sipes coact with the coils to improve the action of the metal staples formed after the tops of the metal coils have worn off, thereby causing a more effective penetration and road gripping action.

A further object of the invention is to provide in a tire tread having circumferentially extending rider strips, a longitudinal convexity on each rider strip of less width than the rider strip, together with transverse recesses which extend inwardly to a depth approximately equal to the depth of the convexity, said transverse recesses being effective in improving traction, and being usable either alone or in combination with transverse sipes or in combination with metal coils or in combination with both metal coils and sipes.

With the above and other objects in view, the invention consists of the improved skid resisting tire tread, and all of its parts and combinations, as set forth in the claims, and all equivalents thereof.

In the accompanying drawings, illustrating preferred embodiments of the invention, in which the same reference numerals designate the same parts in all of the views:

Fig. 2 is a fragmentary transverse sectional view taken principally through one of the rider strips and along the line 2—2 of Fig. 4;

Fig. 3 is a fragmentary view looking at the side of one of the rider strips;

Fig. 4 is a fragmentary view looking at the top of a rider strip piece such as that of Fig. 3;

Fig. 5 is a fragmentary view similar to Fig. 3 looking at the side of a rider strip but showing a slight modification; and Fig. 6 is a fragmentary view similar to Figs. 3 and 5 showing another form of the invention.

Figure 1:
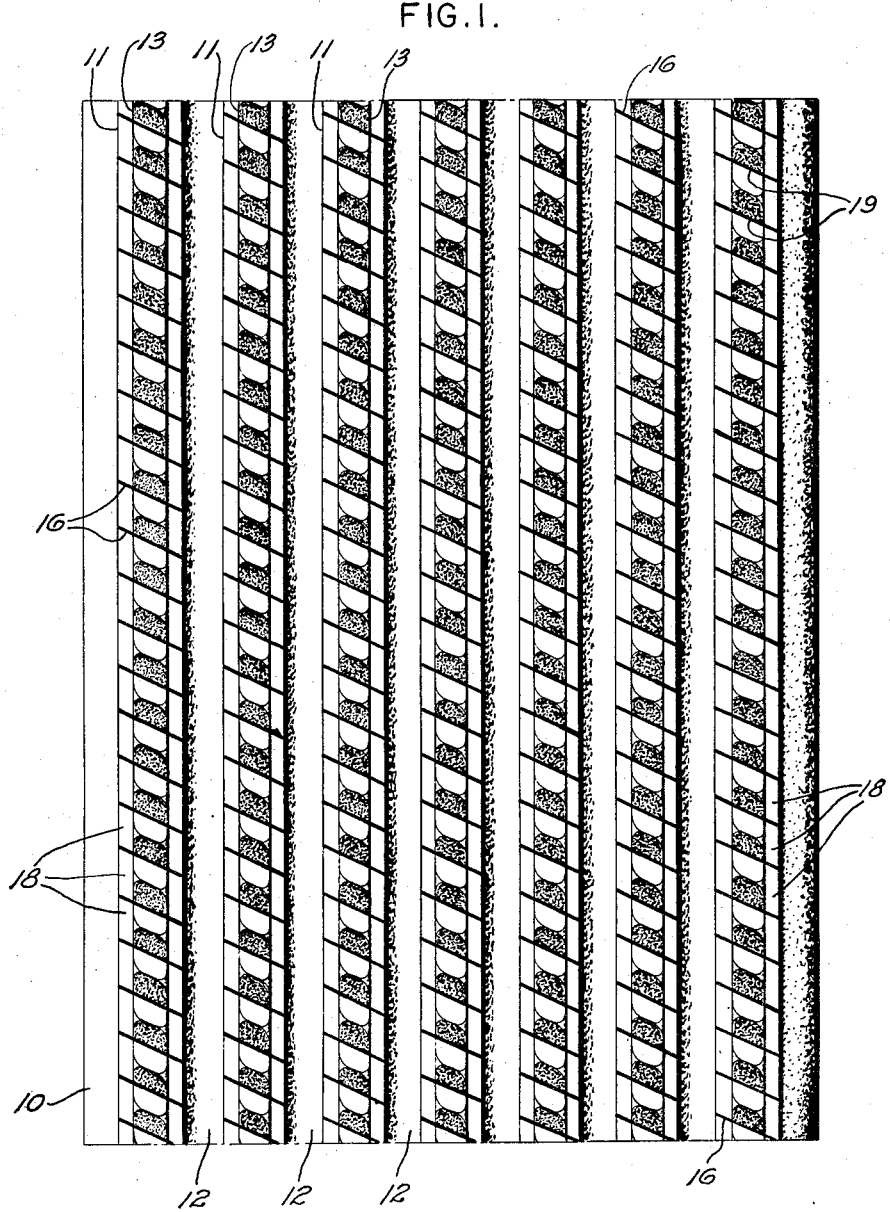
Fig. 1 is a fragmentary plan view of the tread surface of a tire.

Referring more particularly to the drawings, the numeral 10 designates the tread portion of a tire having spaced circumferentially extending rider strips 11 separated by intervening circumferentially extending grooves 12. In the form of the invention illustrated, each rider strip has its road engaging surface formed with a longitudinally extending convexity 13 (see particularly Fig. 2), which convexity is of less width than the rider strip.

Extending longitudinally in each rider strip is a skid resisting helical metal coil 14, which coil has a side portion projecting into and substantially fitting the convexity 13, as shown in Fig. 2. The coil illustrated is formed of two twisted together strands of wire of the type illustrated in Fig. 2 of Crooker Patent No. 2,557,945. Other types of coils such as those shown in Crooker Patent No. 2,479,474 may be employed. These coils are formed of hard wear resistant metal, and are so disposed in the rider strips that there are separated convolution portions 15 (see Fig. 4) near the wearing surface of a rider strip which extend transversely of the rider strip at an oblique angle.

Between each pair of said oblique convolution portions 15 is a transverse slit or sipe 16. Each slit preferably extends completely across the rider strip as illustrated in Fig. 4, but this is not essential. The slits terminate short of convolution portion 17 of the coil which are near the bottom of the rider strip. These portions 17 extend at an opposite oblique angle from the direction of the top or outer portions 15 of the coil.

These slits divide the rider strip into a multiplicity of transverse blocks 18, and it is to be noted that one of the coil convolution portions 17 passes below the bottom of each slit to tie one block with the next adjacent block as is best shown in Fig. 4. It is preferred to have the slits 16 extend at substantially the same oblique angle across the rider strip as the angle of the convolution portions 15 with a slit midway between two of said portions 15.

In the form of the invention illustrated in Figs. 1, 2, 3 and 4 there are, in addition to the slits, transverse recesses 19. These recesses extend from the wearing surface of the convexity 13 inwardly to a depth approximately equal to the depth of the convexity as is clear from Fig. 3. Each recess has its lowest point located approximately midway between a pair of the obliquely extending convolution portions 15 of the coil, and each recess preferably extends at the same oblique angle as said convolution portions and at the same oblique angle as the slits 16, each slit coinciding approximately with the bottom of a recess 19. The recesses 19 of Figs. 1, 3 and 4, are substantially V-shaped in cross section.

In the modification of Fig. 5 the construction is substantially identical to that of Figs. 1–4 inclusive except for the fact that the recesses 19' are U-shaped in cross section instead of V-shaped.

In the form of the invention of Fig. 6, each rider strip preferably has the longitudinal convexity 13 but there are no transverse recesses such as the recesses 19 and 19' across the convexity. The same slits 16 are, however, utilized and, aside from the absence of the transverse recesses 19, the construction is otherwise identical to that shown in Figs. 3 and 4.

While Fig. 1 shows the slits 16 of one rider strip angled in the same direction as the slits of the next rider strip, it is to be understood that the pitch lead of the coils 14 may be reversed in alternating rider strips, which reversal would result in reversal of the angle of the slits in alternating rider strips.

In use of tires equipped with the improved tread, which tread may be installed either as part of a retreading operation or in the process of new tire manufacture, during the early stages of use and before the tops of the metal coils 14 have worn off to produce a multiplicity of staples, the transverse grooves 19 or 19', together with the slits 16, are effective in producing improved anti-skid traction immediately after the tire is put in use.

After the tops of the coils have been worn off to produce a multiplicity of staples then, of course, the major portions of the convexities 13 will also be worn off, as well as the recesses 19 or 19'. By this time, however, there is a multiplicity of staple ends which act in the manner of a cat's claws to effectively grip the road. It is to be noted that at this stage the portions 15 of the coils are worn off leaving staples, and that each staple has a convolution portion 17 at the bottom. Therefore, one staple will be connected to two of the slit-separated rubber blocks 18.

The sipes or slits cause the rubber blocks to engage the road one after another, much in the manner of a track laying wheel, and there is a tendency for the slits to open up and give effective traction. By tying the blocks together with the staple portions 17, excessive opening of the slits and hence excessive wear on the rubber edges at the slits is prevented. Thus, the edges at the slits are kept sharp. At the same time the tendency of the slits to open up gives a live action to the rider strip and causes the points or claws of the staples to be projected more effectively with better road gripping results.

Reference is made to copending design application Serial D. 27,513, filed November 9, 1953, which illustrates certain features of the present invention.

Although only a few forms of the invention have been illustrated, various changes and modifications may be made without departing from the spirit of the invention, and all of such changes are contemplated as may come within the scope of the claims.

What we claim is:

1. In a tire having a rubber tread portion formed with a plurality of laterally spaced circumferentially extending rider strips, there being grooves between said rider strips having bottoms, at least one of said rider strips having its road engaging surface formed with a longitudinally extending convexity which is of less width than the rider strip, a helical metal ice-gripping coil extending longitudinally within said rider strip, said coil having a side portion projecting into said convexity and said coil portion in the convexity including portions of convolutions which extend transversely of the rider strip at an oblique angle, and said convexity having transverse recesses, each recess being between a pair of said oblique convolutions, and there being a transverse slit in each recess extending inwardly between a pair of said coil convolutions to divide the rider strip into transverse blocks, there being a convolution portion of the coil below the bottom of a slit and connecting one block with the next adjacent block.

2. In a tire having a rubber tread portion formed with a plurality of laterally spaced circumferentially extending rider strips, there being grooves between said rider strips having bottoms, a helical metal coil extending longitudinally within at least one of said rider strips, each coil being positioned entirely within a rider strip and above the bottoms of the grooves and having outermost convolution portions near the wearing surface which extend transversely of the rider strip at an oblique angle, there being innermost convolution portions which extend at an oblique angle in a reverse direction with respect to the direction of extent of said outermost convolution portions, and said rider strip having circumferentially spaced transverse slits therein with each slit extending from the wearing surface of the rider strip inwardly between a pair of said outermost oblique convolution portions and in the same general direction and terminating short of the innermost convolution portions and extending transversely of the latter to divide the rider strip into transverse blocks, said innermost convolution portions of the coil being below the bottoms of the slits and within the rider strip and also being above the bottoms of said grooves and serving to connect one block with the next adjacent block.

3. In a tire having a rubber tread portion formed with a plurality of laterally spaced circumferentially extending rider strips, there being grooves between said rider strips having bottoms, an elongated metal traction augmenting member formed of a continuous piece of bent wire extending longitudinally within at least one of said rider strips entirely within the latter and having outermost portions near the wearing surface of the rider strip, there being innermost wire connecting portions which extend transversely of the rider strip above the bottoms of the grooves, said rider strip having circumferentially spaced transverse slits therein with each slit extending from the wearing surface of the rider strip inwardly and terminating short of the innermost connecting portions of said traction augmenting member and extending transversely thereof to divide the rider strip into transverse blocks, said connecting portions of the traction augmenting member being below the bottoms of the slits and within the rider strip and above the bottoms of the grooves and serving to connect one block with the next adjacent block.

4. In a traction member having a rubber tread portion formed with a plurality of laterally spaced circumferentially extending ribs, there being grooves between said ribs having bottoms, an elongated metal traction augmenting member formed of a continuous piece of bent wire extending longitudinally within at least one of said ribs entirely within the latter and having outermost portions near the wearing surface of the rib, there being innermost wire connecting portions which extend transversely of the rib above the bottoms of the grooves, said rib having circumferentially spaced transverse slits therein with each slit extending from the wearing surface of the rib inwardly and terminating short of the innermost connecting portions of said traction augmenting member and extending transversely thereof to divide the rib into transverse blocks, said connecting portions of the traction augmenting member being below the bottoms of the slits and within the rib and above the bottoms of the grooves and serving to connect one block with the next adjacent block.

References Cited in the file of this patent

UNITED STATES PATENTS

| | | |
|---|---|---|
| 1,211,958 | Overman | Jan. 9, 1917 |
| 2,094,636 | Bull | Oct. 5, 1937 |
| 2,479,474 | Crooker | Aug. 16, 1949 |
| 2,557,945 | Crooker | June 26, 1951 |
| 2,610,357 | Hawkinson | Sept. 16, 1952 |

FOREIGN PATENTS

| | | |
|---|---|---|
| 6,927 | Great Britain | 1908 |
| 486,794 | Canada | Sept. 23, 1952 |